(12) United States Patent
Rasmussen et al.

(10) Patent No.: US 10,824,471 B2
(45) Date of Patent: Nov. 3, 2020

(54) BUS ALLOCATION SYSTEM

(71) Applicant: Dell Products L.P., Round Rock, TX (US)

(72) Inventors: Karl Rasmussen, Temple, TX (US); Wei G. Liu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/361,532

(22) Filed: Mar. 22, 2019

(65) Prior Publication Data
US 2020/0301742 A1    Sep. 24, 2020

(51) Int. Cl.
*G06F 13/20* (2006.01)
*G06F 9/50* (2006.01)
*G06F 9/4401* (2018.01)

(52) U.S. Cl.
CPC .......... *G06F 9/5011* (2013.01); *G06F 9/4411* (2013.01); *G06F 13/20* (2013.01)

(58) Field of Classification Search
None
See application file for complete search history.

(56) References Cited

U.S. PATENT DOCUMENTS

| | | | |
|---|---|---|---|
| 4,229,792 A | 10/1980 | Jensen et al. | |
| 4,503,495 A | 3/1985 | Boudreau | |
| 8,930,609 B2 * | 1/2015 | Natu | H04L 63/101 710/315 |
| 9,747,245 B2 * | 8/2017 | Guddeti | G06F 11/3027 |
| 2009/0006708 A1 * | 1/2009 | Lim | G06F 13/4022 710/314 |
| 2009/0063741 A1 * | 3/2009 | Lu | G06F 13/409 710/301 |
| 2009/0077297 A1 * | 3/2009 | Zhao | G06F 9/5011 710/314 |
| 2017/0090949 A1 * | 3/2017 | Arms | G06F 9/4411 |

OTHER PUBLICATIONS

David A. Rusling, "Book: The Linux Kernel, Table Of Contents—Chapter 6 PCI," 1996-1999, 12 Pages, Version 0.8-3, United Kingdom, https://www.tidp.org/LDP/tlk/dd/pci.html.

* cited by examiner

*Primary Examiner* — Elias Mamo
(74) *Attorney, Agent, or Firm* — Haynes and Boone, LLP

(57) ABSTRACT

A bus allocation system includes at least one connector coupled to a plurality of devices, and a processing subsystem that includes at least one root port that is coupled to the at least one connector. The processing system executes instructions that are stored on a memory subsystem in order to provide a Basic Input Output System (BIOS) that is configured, during a boot process, to assign temporary bus values to each of the plurality of devices that are coupled to the connector. Based on the assigned temporary bus values, the BIOS detects each link that couples each of the plurality of devices to the connector, and determines a bus allocation count based on the detected links. The BIOS then allocates a number of buses for the at least one root port based on the bus allocation count.

20 Claims, 5 Drawing Sheets

BUS ALLOCATION SYSTEM

BACKGROUND

The present disclosure relates generally to information handling systems, and more particularly to allocating buses in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as server devices utilize a Basic Input Output System (BIOS) such as, for example, a Universal Extensible Firmware Interface (UEFI) BIOS provided according to the UEFI specification, which operates to initialize the server device such that it may enter a runtime state in which runtime operations are performed by an operating system included in the server device. As part of that initialization, buses are allocated to devices connected to the processing system in the server device so that the processing system may communicate with those connected devices. However, because of performance and/or security considerations that call for knowledge of details of the server device early in the initialization process (e.g., during a Pre-Extensible Firmware Interface (EFI) Initialization (PEI) phase), many new processing systems are beginning to require that buses be allocated before the UEFI BIOS is completely aware of the devices connected to the processing system, which raises some issues.

For example, some processing systems that require the early bus allocations discussed above are provided with their Input/Output (I/O) subsystems divided into units called "stacks", with each stack providing a Peripheral Component Interconnect express (PCIe) host component that includes one or more root ports on the processing system, a controller subsystem provided by a controller (e.g., an INTEL® I/O Advanced Programmable Interrupt Controller (IOAPIC)) in the processing system, and a logic subsystem provided by logic in the processing system. In those processing systems, the early bus allocation discussed above is achieved by allocating the buses available to the server device (e.g., 256 available buses) by dividing those available buses evenly between the stacks (e.g., for a server device having eight stacks, each stack is allocated 32 buses). However, some server devices may include stacks that require more buses than are allocated using the techniques discussed above, and even though such server devices will often include other stacks that are not utilizing the buses that were allocated to them, the conventional UEFI BIOS provided in server devices is not capable of re-allocating buses from a stack that is not using them to a stack that requires more buses. This is at least partly due to the limits of what the processing system can support at such an early stage in the initialization process, and difficulties associated with writing any discovery information in the resource-limited environment that exists at that early stage in the initialization process.

Accordingly, it would be desirable to provide an improved bus allocation system.

SUMMARY

According to one embodiment, an Information Handling System (IHS) includes a Basic Input Output System (BIOS) processing system; and a BIOS memory system that is coupled to the BIOS processing system and that includes instructions that, when executed by the BIOS processing system, cause the BIOS processing system to provide a BIOS engine that is configured, during a boot process, to: assign temporary bus values to each of a plurality of devices that are coupled to at least one root port provided on the BIOS processing system; detect, based on the assigned temporary bus values, each link that couples each of the plurality of devices to the at least one root port; determine, based on the detected links, a bus allocation count; and allocate, based on the bus allocation count, a number of buses for the at least one root port.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
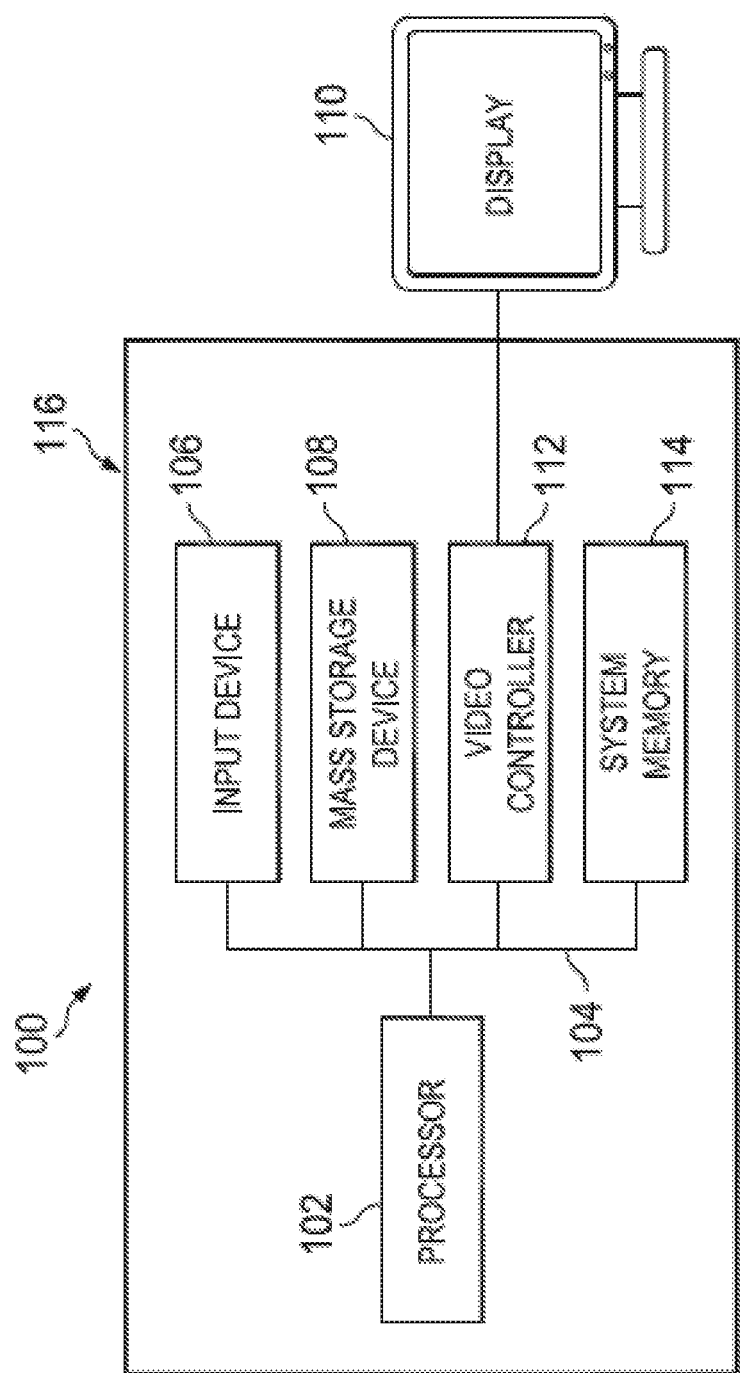
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
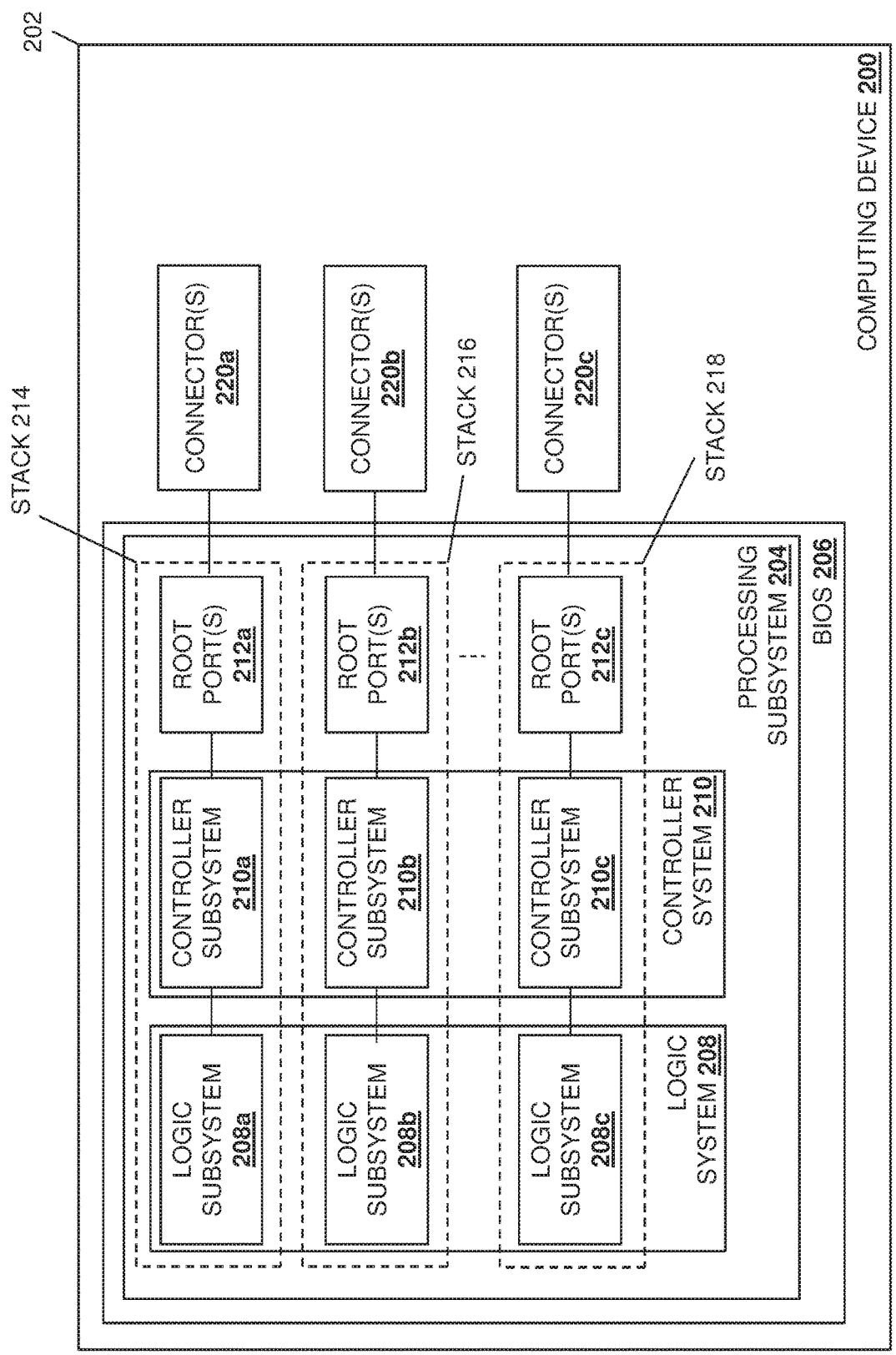
FIG. 2 is a schematic view illustrating an embodiment of a computing device that includes the bus allocation system of the present disclosure.

Referring now to FIG. 2, an embodiment of a computing device 200 is illustrated that may provide the bus allocation system of the present disclosure. The computing device 200 may be provided by the IHS 100 discussed above with reference to FIG. 1 and/or may include some or all of the components of the IHS 100. Furthermore, while one of skill in the art in possession of the present disclosure will recognize that the computing device 200 is illustrated and discussed below as a server device, one of skill in the art in possession of the present disclosure will recognize that the functionality of the computing device 200 discussed below may be provided by networking devices, desktop computing devices, laptop computing devices, and/or other devices that are configured to operate similarly as discussed below. In the illustrated embodiment, the computing device 200 includes a chassis 202 that houses the components of the computing device 200, only some of which are illustrated below. For example, in the illustrated embodiment the chassis 202 houses a processing subsystem 204 (e.g., which may include the processor 102 discussed above with reference to FIG. 1) that may be coupled to a memory subsystem (not illustrated, but which may include the memory 114 discussed above with reference to FIG. 1) that includes instructions that, when executed by the processing subsystem 204, cause the processing subsystem 204 to provide a BIOS 206 that is configured to perform the functionality of the BIOS and/or computing devices discussed below.

In the illustrated embodiment, the processing subsystem 204 includes a logic system 208. The processing subsystem 204 also includes a controller system 210 that is coupled to the logic subsystem 208, and may be provided by an INTEL® I/O Advanced Programmable Interrupt Controller (IOAPIC) and/or other controller systems that would be apparent to one of skill in the art in possession of the present disclosure. The processing subsystem 204 also includes a plurality of root ports that are coupled to the controller system 210. In the specific examples illustrated and discussed below, the processing subsystem 204 is provided with its Input/Output (I/O) subsystem divided into units called "stacks", with each stack providing a Peripheral Component Interconnect express (PCIe) host component that includes one or more root ports in the processing subsystem 204, a controller subsystem provided by the controller system 210 in the processing subsystem 204, and a logic subsystem provided by the logic system 208 in the processing subsystem 204. However, while the processing subsystem 204 is discussed as including PCIe host components provided via its I/O subsystem divided into stacks, one of skill in the art in possession of the present disclosure will recognize that the techniques discussed herein for allocating buses for devices that are coupled to root ports in a processing subsystem will be beneficial to a variety of processing subsystems and processing subsystem configurations, and thus those processing subsystems and processing subsystem configurations will fall within the scope of the present disclosure as well.

Thus, in the specific example illustrated in FIG. 2, a stack 214 includes one or more root ports 212a, a controller subsystem 210a provided by the controller system 210, and a logic subsystem 208a provided by the logic system 208; a stack 216 includes one or more root ports 212b, a controller subsystem 210b provided by the controller system 210, and a logic subsystem 208b provided by the logic system 208; and up to a stack 218 that includes one or more root ports 212c, a controller subsystem 210c provided by the controller system 210, and a logic subsystem 208c provided by the logic system 208. Furthermore, one or more connectors 220a are coupled to the stack 214 via the one or more root ports 212a, one or more connectors 220b are coupled to the stack 216 via the one or more root ports 212b, and one or more connectors 220c are coupled to the stack 218 via the one or more root ports 212c. In several of the examples discussed below, the connector(s) 220a, 220b, and 220c are provided by PCIe connectors, although other types of connectors may fall within the scope of the present disclosure as well. While a specific computing device 200 has been illustrated, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the functionality discussed below, while remaining within the scope of the present disclosure as well.

Figure 3:
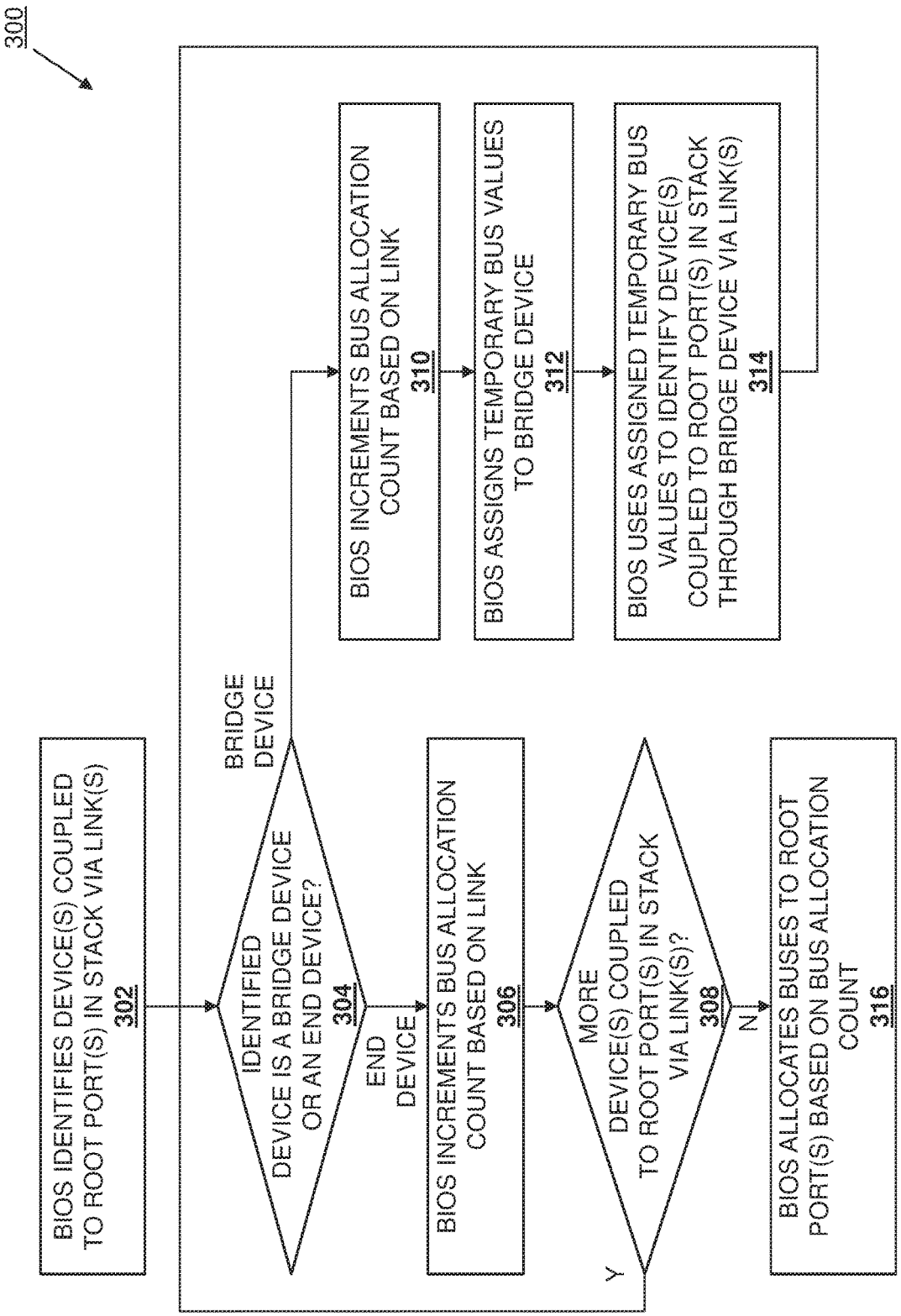
FIG. 3 is a flow chart illustrating an embodiment of a method for allocating buses.

Referring now to FIG. 3, an embodiment of a method for allocating buses is illustrated. As discussed below, the systems and methods of the present disclosure provide for bus allocation requirement discovery early in the boot process, which allows the BIOS to allocate buses based on the actual system configuration, and without the need to guess a bus allocation or have a user input a bus allocation strategy. In some embodiments, this may be enabled via a BIOS that is configured, at the beginning of a boot process when devices in the system are visible but prior to the availability of the host memory, to identify each device that is coupled to one or more root ports that are part of a stack, increment a bus allocation count for each link that couples those devices to the root port(s) that are part of the stack, and then allocate a number of buses to the root port(s) that are part of the stack based on the bus allocation count. In particular, the BIOS may increment the bus allocation count for each link that couples an end device or a bridge device to the root port(s) that are part of the stack, while temporarily assigning bus values to any bridge device(s) that are coupled to the root port(s) that are part of the stack so that devices coupled to those bridge device(s) may be identified and the bus allocation count may be incremented for their associated links as well. The process described above may be applied to any particular stack to identify each device coupled to the root port(s) that are part of that stack, and increment the bus allocation count for all of their associated links, allowing the allocation of the number of buses based on the bus allocation count to allocate only the number of buses that are needed for that stack/those root port(s). The process may then be repeated for each stack in the system so that each stack is allocated a number of buses needed for the devices that are actually coupled to that stack via its root port(s). As discussed above, in some examples, each link that couples a hot-plug-capable connector to the root port(s) that are part of a stack may also have a bus allocated to them as well in order to enable for the hot-plugging of device(s) to those hot-plug-capable connector(s) during runtime. As such, the limited number of bus allocations that are available to a system may be allocated based on the actual configuration of the system, rather than simply split between root port(s)/stacks equally, thus providing for more efficient bus allocations.

The method 300 begins at block 302 where a BIOS identifies device(s) coupled to root port(s) in a stack via link(s). In an embodiment, at or prior to block 302, the computing device 200 may be started up, powered on, reset, re-booted, and/or otherwise initialized, and the BIOS 206 may begin operations as part of a boot/initialization process. In a specific example, the computing device 200 may be a "two-socket" server device that includes two processors, and the bus allocation operations discussed below may be performed at the beginning of a server device boot/initialization process and during the initialization of a processor-to-processor connection (e.g., an INTEL® Ultra Path Interconnector (UPI) connection), which one of skill in the art in possession of the present disclosure will recognize occurs prior to the availability of the host memory to those processors (i.e., because the host memory is connected to those processors and cannot be accessed until the processor-to-processor connection has been initialized.) However, while a specific example of the timing of the bus allocation operations of the present disclosure is described, one of skill in the art in possession of the present disclosure in the art will recognize that the bus allocation operations of the present disclosure may be performed with other systems and/or at other times during a boot/initialization process while remaining within the scope of the present disclosure as well.

Figure 4:
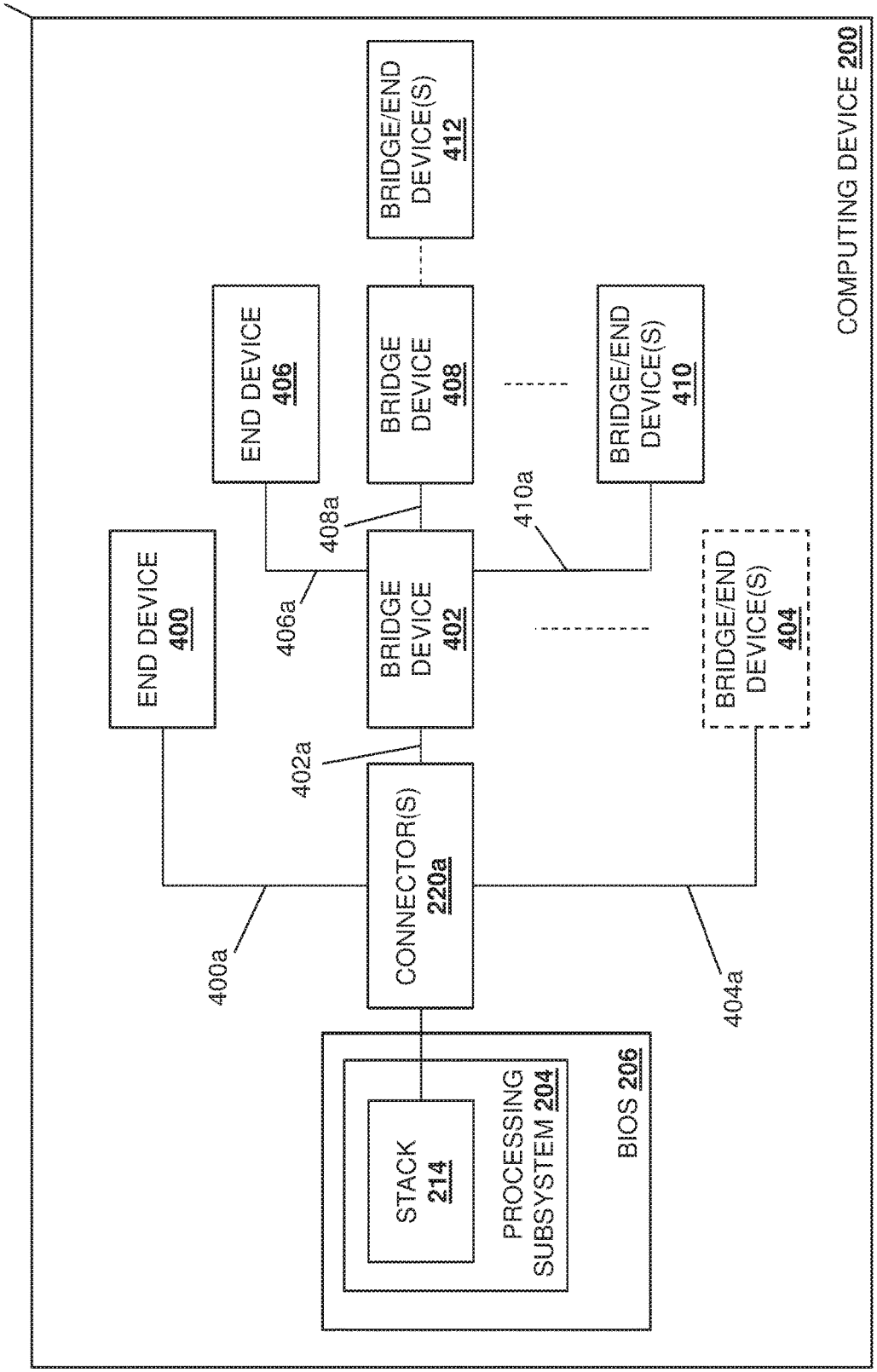
FIG. 4 is a schematic view illustrating an embodiment of the bus allocation system in the computing device of FIG. 2 during the method of FIG. 3.

In an embodiment, at block 302 and once the boot/initialization process has progressed to a point where the hardware in the computing device 200 has been sufficiently initialized so that connected devices (e.g., PCIe devices, other devices discussed below, and/or other connected devices known in the art) are visible to the BIOS 206, the BIOS 206 operates to identify devices that are coupled via links to root port(s) that are included in a stack. With reference to FIG. 4, a specific example of the computing device 200 is illustrated with an end device 400 directly connected via a link 400a to the connector(s) 220a that are coupled to the root port(s) 212a in the stack 214, a bridge device 402 directly connected via a link 402a to the connector(s) 220a that are coupled to the root port(s) 212a in the stack 214, and one or more optional bridge/end device(s) 404 that may each be directly connected via one or more respective links 404a to the connector(s) 220a that are coupled to the root port(s) 212a in the stack 214. At block 302, the BIOS 206 may operate to identify each of the devices 400, 402, and the optional device(s) 404, that are directly connected to the connector(s) 220a that are coupled to the root port(s) 212a in the stack 214 via, for example, PCI configuration space reads (e.g., using a PCIe bridge class code) and/or other device identification techniques known in the art. As discussed above, in some embodiments, the connector(s) 220a are PCIe connector(s), and thus the devices 400, 402, and up to 404 may be provided by PCI devices. However, other types of connectors and/or devices will fall within the scope of the present disclosure as well.

The method 300 then proceeds to decision block 304 where the BIOS determines whether an identified device is a bridge device or an end device. As discussed below, the BIOS 206 may operate via decision block 304 to determine whether device(s) identified at block 302 are an end device or a bridge device. As would be understood by one of skill in the art in possession of the present disclosure, and as discussed in further detail below, bridge devices coupled to root port(s) that are included in a stack are devices that are coupled via a link to those root port(s), and that provide links that couple other devices to those root port(s). Furthermore, end devices coupled to root port(s) that are included in a stack are devices that are coupled via a link to those root port(s) (e.g., provided by a connector or a bridge device), and that do not provide any links that couple other devices to those root port(s)/that stack. In some embodiments, the BIOS 206 may determine whether a device identified at block 302 is end device or a bridge device via, for example, the PCI configuration space reads (e.g., using a PCIe bridge class code) discussed above, and/or using other device identification techniques that would be apparent to one of skill in the art in possession of the present disclosure. As such, with reference to the specific example provided in FIG. 4, at decision block 304 the BIOS 206 may determine that the end device 400 is an end device, the bridge device 402 is a bridge device, and that the bridge/end device(s) 404 are either bridge devices or end devices.

If, at decision block 304, it is determined that the identified device is an end device, the method 300 proceeds to block 306 where the BIOS increments a bus allocation count based on the link. In an embodiment, at block 306 and in response to determining that an identified device is an end device, the BIOS 206 operates to increment a bus allocation count, which operates in effect to identify that the link to that end device requires a bus allocation. For example, with reference to the specific example provided in FIG. 4, at block 306 the BIOS 206 may operate to increment the bus allocation count for the link 400a that connects the end device 400 to the connector(s) 220a. The method 300 then proceeds to decision block 308 where the BIOS determines whether more device(s) are coupled to the root port(s) in the stack via link(s). Continuing with the example of the computing device 200 illustrated in FIG. 4, following the incrementing of the bus allocation count for the link 400a to the end device 400 and at decision block 308 of the method 300, the BIOS 206 operates to determine that another device (e.g., the bridge device 402 or the bridge/end device(s) 404) is coupled to the root port(s) 212a in the stack 214 via link(s) connected to the connector(s) 220a.

If at decision block 308, it is determined that more device(s) are coupled to the root port(s) in the stack via link(s), the method 300 returns to decision block 304. Continuing with the example of the computing device 200 illustrated in FIG. 4, for each loop of the method 300 in which the BIOS 206 determines that a device that is coupled to the root port(s) 212a in the stack 214 via link(s) connected to the connector(s) 220a is an end device (e.g., any of the bridge/end device(s) 404 that are provided by an end device coupled to the connector(s) 220a via one of the links 404a), the BIOS 206 will increment the bus allocation count, and then loop back through the method 300. As such, the method 300 may loop through blocks 304, 306, and 308 such that the bus allocation count is incremented for each link to an end device that is coupled to the root port(s) 212a in the stack 214.

If, at decision block 304, it is determined that the identified device is bridge device, the method 300 proceeds to block 310 where the BIOS increments a bus allocation count based on the link. Continuing with the example of the computing device 200 illustrated in FIG. 4, for each loop of the method 300 in which the BIOS 206 determines that a device coupled to the root port(s) 212a in the stack 214 via link(s) connected to the connector(s) 220a is bridge device (e.g., the bridge device 402 coupled to the connector(s) 220a via the link 402a, and any of the bridge/end device(s) 404 that are provided by an bridge device coupled to the connector(s) 220a via one of the links 404a), the BIOS 206 will increment the bus allocation count. As will be understood by one of skill in the art in possession of the present disclosure, while the method 300 is discussed as first incrementing the bus allocation count for each of the links to the end devices that are coupled to the connector(s) 220a, and then incrementing the bus allocation count for each of the links to the bridge devices that are coupled to the connector(s) 220a, the BIOS 206 may determine that devices coupled to the connector(s) 220a via link(s) are end devices and bridge devices in the order they are connected while remaining within the scope of the present disclosure. As such, a first iteration of the method 300 may result in the incrementing of the bus allocation count for the link 400a to the end device 400, a second iteration of the method 300 may result in the incrementing of the bus allocation count for the link 402a to the bridge device 402 (followed by the operations discussed below), and subsequent iterations of the method 300 may result in the incrementing of the bus allocation count for the link(s) 404a to the bridge device(s) and end device(s) included in the bridge/end device(s) 404 in the order they are connected to the connector(s) 220a.

The method 300 then proceeds to block 312 where the BIOS assigns temporary bus values to the bridge device. In an embodiment, at block 312 and during any iteration of the method 300, the BIOS 206 may operate to assign temporary bus values to any bridge device that is identified as coupled to the root port(s) 212a via the connector(s) 220a. While the method 300 of FIG. 3 illustrates the temporary bus values being assigned to each bridge device that is identified as coupled to the root port(s) 212a via the connector(s) 220a prior to the method 300 returning to decision block 304 to determine whether other device(s) coupled to the root port(s) 212a via the connector(s) 220a, one of skill in the art in possession of the present disclosure will recognize that, in some embodiments, the BIOS 206 may operate to first identify end device(s) and bridge device(s) coupled to the root port(s) 212a via the connector(s) 220a, and may then increment the bus allocation count for those devices before operating to then assign each bridge device coupled to the root port(s) 212a via the connector(s) 220a the temporary bus values at block 312. One of skill in the art in possession of the present disclosure will recognize that the temporary bus allocations performed at block 312 may break bus allocation rules that must be followed in the final bus allocation that occurs at block 316 (as discussed below) by, for example, reusing bus allocations across root port(s)/stacks. However, because those temporary bus allocations are not needed for the operation of the computing device 200 during runtime, the failure to follow those bus allocation rules does not raise any issues, and is remedied during final bus allocation.

Figure 5:
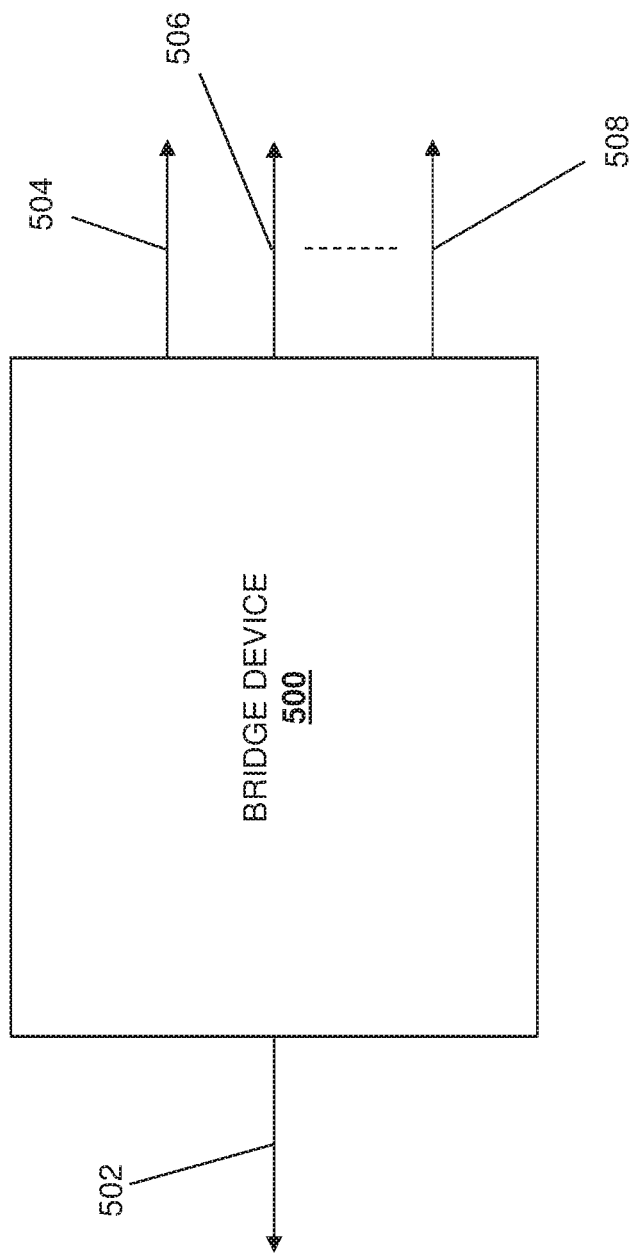
FIG. 5 is an embodiment of a bridge device that may be included in the computing device of FIG. 2 during the method of FIG. 3.

With reference to FIG. 5, an embodiment of a bridge device 500 is illustrated that may be any of the bridge devices that are discussed below as being coupled to the root port(s) 212a in the stack 214, and that includes a primary link 502 that may couple the bridge device 500 to a connector or other bridge device, along with secondary links 504, 506, and up to 508 that may couple other devices (e.g., end devices and/or bridge devices) to the bridge device 500. As such, at block 312, the BIOS 206 may assign a plurality of temporary bus values to the bridge device 500 for use in discovering device(s) coupled to the link(s) 504, 506, and up to 508. As will be appreciated by one of skill in the art in possession of the present disclosure, the BIOS 206 may temporarily assign a number of bus values to the bridge device 500 that will allow for the use of those bus values to detect and identify each device coupled to the links 504, 506, and up to 508. Thus, in some examples, the BIOS 206 may assign the bridge device 500 a number of temporary bus values that is expected to be more than the number of devices coupled to the links 504, 506, and up to 508.

Furthermore, as discussed for some of the examples below, the BIOS 206 may be configured to assign additional temporary bus values to the bridge device 500 such as, for example, in the event that all of the temporary bus values that were previously assigned to the bridge device 500 are used up in detecting/identifying of devices coupled to the links 504, 506, and up to 508, and there is the possibility of additional device(s) coupled to additional available links on the bridge device 500. In a specific example, it may be determined that there may be additional device(s) coupled to additional available links on the bridge device 500 when all the temporary bus values that were previously assigned to the bridge device 500 have been used to detect/identify devices coupled to that bridge device 500, and the final available temporary bus value that was assigned to the bridge device 500 (i.e., in the group of temporary bus values that have already been used to detect/identify devices coupled to the links 504, 506, and up to 508) is used to detect/identify a device coupled to one of those links, a situation which one of skill in the art in possession of the present disclosure will recognize will require at least one more temporary bus value be assigned in order to detect/identify whether any other device(s) are coupled to any additional available links on the bridge device 500.

Further still, as discussed for some of the examples below, the BIOS 206 may be configured to remove temporary bus values that were assigned to the bridge device 500 such as, for example, in the event a first subset of the temporary bus values assigned to the bridge device 500 are used in detecting/identifying devices coupled to the links 504, 506, and up to 508, and there a second subset of the temporary bus values that were assigned to the bridge device 500 that will not be needed to detect/identify devices coupled to the links 504, 506, and up to 508. In a specific example, it may be determined that there is a second subset of the temporary bus values that were assigned to the bridge device 500 and that are not be needed to detect/identify devices coupled to the links 504, 506, and up to 508 when the BIOS 206 determines that no more devices and/or links can be identified/detected on the bridge device 500. However, while specific examples for adding/removing temporary bus values assigned to a bridge device has been described, one of skill in the art in possession of the present disclosure will recognize how the temporary bus values (which may be limited in number) may be efficiently utilized for assignment to bridge devices in a variety of manners that will fall within the scope of the present disclosure as well.

As such, continuing with the example of the computing device 200 illustrated in FIG. 4, the BIOS 206 may operate during the method to first increment the bus allocation count for the link 400a that couples the end device 400 to the root port(s) 212a in the stack 214 via the connector(s) 220a, then increment the bus allocation count for the link 402a that couples the bridge device 402 to the root port(s) 212a in the stack 214 via the connector(s) 220a, and then increment the bus allocation count for each link 404a that couples a bridge/end device 404 to the root port(s) 212a in the stack 214 via the connector(s) 220a (e.g., in their order of connection.) Following the incrementing of the bus allocation counts, the BIOS 206 may then assign the bridge device 402 the temporary bus values at block 312 and utilize those temporary bus values as discussed below, and then do the same for any of the bridge/end device(s) 404 that are provided by bridge devices. However, while a specific order for incrementing the bus allocation count of the present disclosure has been described, as well as a specific assignment of the bus temporary bus values to bridge devices has been described, one of skill in the art in possession of the present disclosure will recognize that the order of bus allocation incrementation and/or bridge device temporary bus value assignment may be changed, and/or may be performed concurrently, while remaining within the scope of the present disclosure as well.

The method 300 then proceeds to block 314 where the BIOS uses the assigned temporary bus values to identify device(s) that are coupled to the root port(s) in the stack through the bridge device via link(s). In an embodiment, at block 314, the BIOS 206 may use the assigned temporary bus values to identify device(s) that are coupled to the root port(s) 212a in the stack 214 through the bridge device identified at decision block 304. Continuing with the example of the computing device 200 illustrated in FIG. 4, an end device 406 is directly connected via a link 406a to the bridge device 402, a bridge device 408 is directly connected via a link 408a to the bridge device 402, and up to one or more optional bridge/end device(s) 410 may each be directly connected via one or more respective links 410a to the bridge device 402. While the devices coupled to the connector(s) 220a are discussed above as PCIe devices coupled to PCIe connectors, devices coupled to the bridge device 402 (and/or other bridge devices that may be coupled to the connector(s) 220a and/or yet other bridge devices) may be PCIe devices (PCIe bridges, PCIe-to-PCI bridges, etc.) or non-PCIe devices (e.g., various switch devices known in the art) while remaining within the scope of the present disclosure.

At block 314 the BIOS 206 may use the temporary bus values assigned to the bridge device 402 at block 312 in order to identify the end device 406 coupled to the bridge device 402 via a link 406a, identify the bridge device 408 coupled to the bridge device 402 via a link 408a, and identify each of the bridge/end device(s) 410 coupled to the bridge device 402 via a link(s) 410a. As discussed above, additional temporary bus value(s) may be assigned to the bridge device 402 in order to enable the detection/identification of every device coupled to the bridge device 402, and temporary bus value(s) that were assigned to the bridge device 402 may be removed/unassigned from the bridge device 402 if all of the devices coupled to the bridge device 402 have been identified, and a subset of those temporary bus values are not needed for device detection/identification.

The method 300 then returns to decision block 304, and the BIOS 206 may loop through the method 300 similarly as described above to determine whether devices coupled to the bridge device 402 are bridge devices or end devices, increment the bus allocation count for each link to those devices, and discover any other devices that are coupled to bridge devices that are directly connected to the bridge device 402. As such, continuing with the example of the computing device 200 illustrated in FIG. 4, the BIOS 206 may operate to increment the bus allocation count for the link 406a to the end device 406, and for each of the link(s) 410a to each of the bridge/end device(s) 410 that are provided by an end device. Furthermore, the BIOS 206 may also operate to increment the bus allocation count for the link 408a to the bridge device 408, and for each of the link(s) 410a to each of the bridge/end device(s) 410 that is provided by a bridge device, as well as assign temporary bus values to each bridge device (i.e., the bridge device 408 and bridge device(s) that provide the bridge/end device(s) 410) in order to detect/identify the devices coupled thereto (e.g., the bridge/end device(s) 412 coupled to the bridge device 408.)

As such, the method 300 may loop through blocks 304, 310, 312, and 314 such that the bus allocation count is incremented for each link to a bridge device that is coupled to the root port(s) in the stack via link(s). One of skill in the art in possession of the present disclosure will recognize that the looping of the method 300 through blocks 304, 306, and 308, along with the looping of the method 300 through blocks 304, 310, 312, and 314, provides for the incrementing of the bus allocation count for each device that is directly connected to the connector(s) 220a coupled to the root ports 212a in the stack 214. Furthermore, the identification of the devices that are coupled to the root port(s) in the stack through bridge devices at block 314, followed by the subsequent looping of the method 300 discussed above, provides for the incrementing of the bus allocation count for each device that is coupled to the connector(s) 220a through one or more bridge devices. As will be understood by one of skill in the art in possession of the present disclosure, the looping of the method 300 to identify each end device and bridge device coupled to the connector(s) 220a directly and via bridge device(s), along with the incrementing of the bus allocation count for each of the links to those devices, provides a bus allocation count that is equal to a number of links that couple each device to the connector(s) 220a.

When each of the devices that are coupled to the root port(s) in the stack via link(s) have been identified, and the bus allocation count has been incremented for each of their corresponding links, it will be determined at decision block 308 that no more devices are coupled to the root port(s) in the stack via link(s), and the method 300 will proceed to block 316 where the BIOS allocates buses to the root port(s) (the "final bus allocation" discussed above) based on the bus allocation count so that each link that couples a device to the root port(s)/stack may be numbered with a bus number that is included in that bus allocation. In some embodiments, following the determination that that no more devices are coupled to the root port(s) 212a in the stack 214 via link(s), the temporary bus allocations assigned to the bridge device(s) coupled to the root port(s) 212a in the stack 214 via link(s) may be discarded (and the bus allocation count stored or otherwise saved by the BIOS 206.)

In an embodiment, at block 316, the BIOS 206 may operate to use the bus allocation count to allocate buses to the root port(s) 212a by allocating buses to the stack 214 that includes those root port(s) 212a. In a specific example, the BIOS 206 may allocate a number of buses to the stack 214 that is equal to the bus allocation count determined according to the method 300. However, in some embodiments, the number of buses allocated to the root port(s) 212a/stack 214 may be greater than the bus allocation count. For example, as would be understood by one of skill in the art in possession of the present disclosure, the computing device 200 may include hot-plug connector(s) that are coupled to the root port(s) 212a included in the stack 214 (e.g., via their inclusion on one of the end devices or bridge devices, via their coupling via one or more link(s) or device(s) to the connectors 212a, etc.), and that are configured to hot-plug to hot-plug devices (e.g., Non-Volatile Memory express (NVMe) storage devices and/or other hot-plug-enabled devices known in the art.) Information about those hot-plug connectors in the computing device 200 may be provided to the BIOS 206 (e.g., programmed in a storage subsystem accessible to the BIOS 206), and may cause the BIOS 206 to allocate a bus for each hot-plug connector that is included in the computing device 200 (e.g., such that the number of buses allocated at block 316 is equal to the bus allocation count plus the number of hot-plug connectors coupled to the root port(s) 212a in the stack 214.) However, while a specific example of the allocation of buses in a number that is greater than the bus allocation count has been described, one of skill in the art in possession of the present disclosure will recognize that other reasons for allocating buses in a number greater than the bus allocation count will fall within the scope of the present disclosure as well.

In some embodiments, the bus allocation system of the present disclosure may be provided in a computing device 200 that is configured to allocate buses conventionally (e.g., by splitting the available buses evenly between the stacks 214, 216, and up to 218). In such embodiments, the allocation of the buses for the stack 214 at block 316 may include the BIOS 206 generating a bus allocation override instruction that identifies the number of buses to allocate based on the bus allocation count, and which operates to override the conventional bus allocation provided for the computing device 200 in order to allocate the buses to the stack 214 according to the teachings of the present disclosure. While only discussed as being performed for the stack 214, one of skill in the art in possession of the present disclosure will recognize that the method 300 may be performed for each stack 214, 216, and up to 218 (e.g., sequentially, concurrently, and/or in any order that would be apparent to one of skill in the art in possession of the present disclosure) in order to allocate buses to each stack 214-218 based on the devices/links coupled to that stack via its root port(s). As such, as part of the performances of the method for each of the stacks 214-218 in order to allocate the buses as discussed above, the BIOS 206 may also perform conventional boot/initialization operations in order to complete the initialization of the computing device 200 so that it may enter a runtime state and perform runtime operations, which may include fabric I/O initialization (in which the locking of the bus allocations provided according to the method 300 to the stacks 214-218 may be performed), the host memory becoming available to the processing system, PCIe device enumeration (in which the full bus allocation discussed above may be performed), and/or other boot/initialization operations known in the art.

Thus, systems and methods have been described that provide for bus allocation requirement discovery early in the boot process, which allows the BIOS to allocate buses based on the actual system configuration. At the beginning of a boot process when PCIe devices in the system are visible but prior to the availability of the host memory, the BIOS identifies each PCIe device that is coupled to one or more root ports that are part of a stack, increments a bus allocation count for each link that couples those PCIe devices to the root port(s) that are part of the stack, and then allocate a number of buses to the root port(s) that are part of the stack based on the bus allocation count. The BIOS also temporarily assigns bus values to any PCIe bridge device(s) that are coupled to the root port(s) that are part of the stack so that PCIe devices coupled to those PCIe bridge device(s) may be identified and the bus allocation count may be incremented for their associated links as well. The process may be applied to any particular stack to identify each PCIe device coupled to the root port(s) that are part of that stack, and increment the bus allocation count for all of their associated links, allowing the allocation of the number of buses to any particular stack based on the bus allocation count so that only the number of buses that are needed for that stack/those root port(s) are allocated to it. The process may then be repeated for each stack in the system so that each stack is allocated a number of buses needed for the PCIe devices that are actually coupled to that stack via its root port(s). As such, the limited number of bus allocations that are available to a system (e.g., 256 bus values in many conventional server devices) may be allocated based on the actual configuration of the system, rather than split between root port(s)/stacks equally, thus providing for more efficient bus allocations.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A bus allocation system, comprising:
   at least one connector;
   a plurality of devices that are coupled to the at least one connector; and
   a processing subsystem that includes at least one root port that is coupled to the at least one connector, wherein the processing subsystem is configured to execute instructions that are stored on a memory subsystem in order to provide a Basic Input Output System (BIOS) that is configured, during a boot process and prior to a host memory becoming available to the processing subsystem, to:
      assign temporary bus values to each of the plurality of devices that are coupled to the connector;
      detect, based on the assigned temporary bus values, each link that couples each of the plurality of devices to the connector;
      determine, based on the detected links, a bus allocation count; and
      allocate, based on the bus allocation count, a number of buses for the at least one root port.

2. The system of claim 1, wherein the BIOS is configured, during the boot process, to:

identify an end device that is included in the plurality of devices and that is coupled to the at least one connector via a respective detected link; and increment, in response to identifying the end device coupled to the at least one connector via the respective detected link, the bus allocation count.

3. The system of claim 1, wherein the BIOS is configured, during the boot process, to:

identify a bridge device that is included in the plurality of devices and that is coupled to the at least one connector via a respective detected link;

increment, in response to identifying the bridge device coupled to the at least one connector via the respective detected link, the bus allocation count;

assign a subset of the temporary bus values to the bridge device; and detect, based on the assigned subset of the temporary bus values, at least one respective link that couples at least one respective device that is included in the plurality of devices to the bridge device.

4. The system of claim 1, wherein the BIOS is configured, during the boot process, to:

determine that each link that couples each of the plurality of devices to the at least one connector has been detected and, in response, allocate the number of buses for the at least one root port based on the bus allocation count.

5. The system of claim 1, wherein the BIOS is configured, during the boot process, to:

discard the assigned temporary bus values following the determination of the bus allocation count.

6. The system of claim 1, wherein the BIOS is configured, during the boot process, to:

detect, based on the assigned temporary bus values, at least one link that is configured to provide at least one hot-plug coupling; and allocate, based on the bus allocation count and the at least one hot-plug coupling, a number of buses for the at least one root port.

7. An Information Handling System (IHS), comprising:

a Basic Input Output System (BIOS) processing system; and a BIOS memory system that is coupled to the BIOS processing system and that includes instructions that, when executed by the BIOS processing system, cause the BIOS processing system to provide a BIOS engine that is configured, during a boot process and prior to a host memory becoming available to a central processing subsystem that is coupled to the BIOS processing system, to:

assign temporary bus values to each of a plurality of devices that are coupled to at least one root port provided on the BIOS processing system;

detect, based on the assigned temporary bus values, each link that couples each of the plurality of devices to the at least one root port;

determine, based on the detected links, a bus allocation count; and allocate, based on the bus allocation count, a number of buses for the at least one root port.

8. The IHS of claim 7, wherein the BIOS engine is configured, during the boot process, to:

identify an end device that is included in the plurality of devices and that is coupled to the at least one root port via a respective detected link; and increment, in response to identifying the end device coupled to the at least one root port via the respective detected link, the bus allocation count.

9. The IHS of claim 7, wherein the BIOS engine is configured, during the boot process, to:

identify a bridge device that is included in the plurality of devices and that is coupled to the at least one root port via a respective detected link;

increment, in response to identifying the bridge device coupled to the at least one root port via the respective detected link, the bus allocation count;

assign a subset of the temporary bus values to the bridge device; and detect, based on the assigned subset of the temporary bus values, at least one respective link that couples at least one respective device that is included in the plurality of devices to the bridge device.

10. The IHS of claim 7, wherein the BIOS is configured, during the boot process, to:

determine that each link that couples each of the plurality of devices to the at least one root port has been detected and, in response, allocate the number of buses for the at least one root port based on the bus allocation count.

11. The IHS of claim 7, wherein the BIOS is configured, during the boot process, to:

discard the assigned temporary bus values following the determination of the bus allocation count.

12. The IHS of claim 7, wherein the BIOS is configured, during the boot process, to:

detect, based on the assigned temporary bus values, at least one link that is configured to provide at least one hot-plug coupling; and allocate, based on the bus allocation count and the at least one hot-plug coupling, a number of buses for the at least one root port.

13. The IHS of claim 7, wherein the BIOS is configured, during the boot process, to:

generate a bus allocation override instruction that identifies the number of buses based on the bus allocation count in order to allocate the number of buses for the at least one root port.

14. A method for allocating buses, comprising:

assigning, by a Basic Input Output System (BIOS) during a boot process and prior to a host memory becoming available to a processing subsystem, temporary bus values to each of a plurality of devices that are coupled to at least one root port provided on the processing system;

detecting, by the BIOS during the boot process and prior to the host memory becoming available to the processing subsystem and based on the assigned temporary bus values, each link that couples each of the plurality of devices to the at least one root port;

determining, by the BIOS during the boot process and prior to the host memory becoming available to the processing subsystem and based on the detected links, a bus allocation count; and allocating, by the BIOS during the boot process and prior to the host memory becoming available to the processing subsystem and based on the bus allocation count, a number of buses for the at least one root port.

15. The method of claim 14, further comprising:

identifying, by the BIOS during the boot process, an end device that is included in the plurality of devices and that is coupled to the at least one root port via a respective detected link; and incrementing, by the BIOS during the boot process in response to identifying the end device coupled to the at least one root port via the respective detected link, the bus allocation count.

16. The method of claim 14, further comprising:
identifying, by the BIOS during the boot process, a bridge device that is included in the plurality of devices and that is coupled to the at least one root port via a respective detected link;
incrementing, by the BIOS during the boot process in response to identifying the bridge device coupled to the at least one root port via the respective detected link, the bus allocation count;
assigning, by the BIOS during the boot process, a subset of the temporary bus values to the bridge device; and
detecting, by the BIOS during the boot process based on the assigned subset of the temporary bus values, at least one respective link that couples at least one respective device that is included in the plurality of devices to the bridge device.

17. The method of claim 14, further comprising:
determining, by the BIOS during the boot process, that each link that couples each of the plurality of devices to the at least one root port has been detected and, in response, allocate the number of buses for the at least one root port based on the bus allocation count.

18. The method of claim 14, further comprising:
discarding, by the BIOS during the boot process, the assigned temporary bus values following the determination of the bus allocation count.

19. The method of claim 14, further comprising:
detecting, by the BIOS during the boot process based on the assigned temporary bus values, at least one link that is configured to provide at least one hot-plug coupling; and
allocating, by the BIOS during the boot process based on the bus allocation count and the at least one hot-plug coupling, a number of buses for the at least one root port.

20. The method of claim 14, further comprising:
generating, by the BIOS during the boot process, a bus allocation override instruction that identifies the number of buses based on the bus allocation count in order to allocate the number of buses for the at least one root port.

* * * * *